United States Patent [19]
Janssen

[11] 4,079,211
[45] Mar. 14, 1978

[54] PROTECTION DEVICE FOR A SUBSCRIBER'S TELEPHONE SET

[75] Inventor: Daniël Johannes Gerardus Janssen, Eindhoven, Netherlands

[73] Assignee: U.S. Philips Corporation, New York, N.Y.

[21] Appl. No.: 697,567

[22] Filed: Jun. 18, 1976

[30] Foreign Application Priority Data
Jun. 30, 1975 Netherlands .................. 7507731

[51] Int. Cl.² ............................................. H04M 1/00
[52] U.S. Cl. .................................. 179/81 R; 179/184
[58] Field of Search ............... 179/81 R, 184, 84 R, 179/186, 16 F; 317/16, 61.5; 340/248 C, 248 P, 253 P

[56] References Cited
U.S. PATENT DOCUMENTS

| | | |
|---|---|---|
| 3,558,830 | 1/1971 | Bender ............................. 179/81 R |
| 3,969,591 | 7/1976 | Sekiguchi ......................... 179/81 R |
| 3,989,902 | 11/1976 | Cowpland ........................ 179/81 R |

*Primary Examiner*—William C. Cooper
*Assistant Examiner*—Joseph A. Popek
*Attorney, Agent, or Firm*—Frank R. Trifari; Henry I. Steckler

[57] ABSTRACT

A protection circuit for a subscriber's telephone set which comprises a resistor applied in series with the subscriber's line to which resistor a threshold device is connected in parallel, a network being provided which comprises the control input and which is connected between the subscribers' lines while the output of the threshold device is connected to the control input to switch the normally high impedance to a low impedance when the threshold voltage of the threshold device is exceeded by the voltage across the resistor.

5 Claims, 1 Drawing Figure

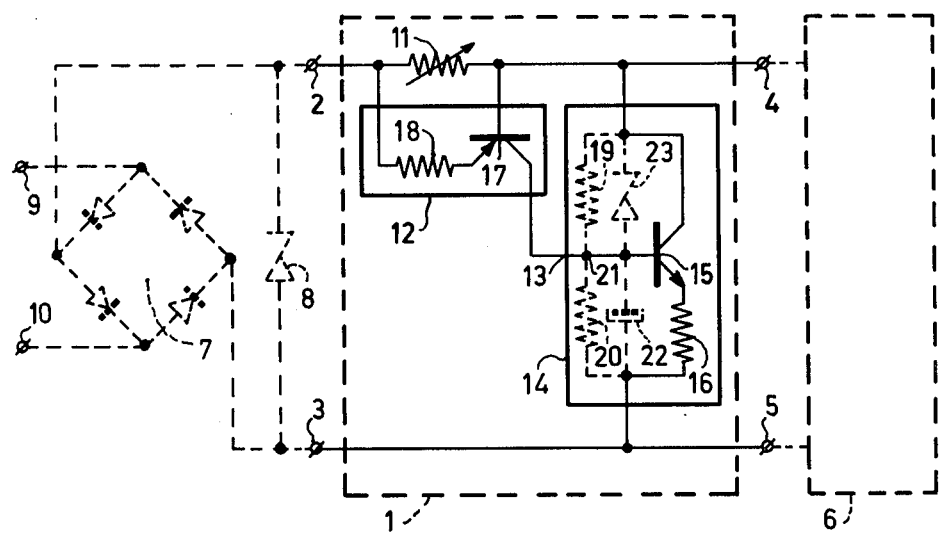

PROTECTION DEVICE FOR A SUBSCRIBER'S TELEPHONE SET

The invention relates to a protection device for a subscriber's telephone comprising a pair of input and output terminals.

There is a tendency to replace the conventional circuits in subscribers' telephones by electronic circuits, for example by introducing a microphone with amplifier and by introducing voice frequency dial signal generators, which circuits are designed in integrated form.

These circuits designed in integrated form are very sensitive to undesired signal conditions such as: an incorrect supply polarity, superfluous supply current owing to a subscriber's line of a short length, disturbing voltages or currents of high peak values, for example owing to lightning discharge or inductance, and a ground fault in one of the subscribers' lines etc.

It is already known to make the subscriber's telephone set insensitive to polarity by the use of a diode bridge (Graetz circuit), to discharge the superfluous line current by the use of a line matching circuit, and to protect the subscriber's telephone set from disturbing voltages of high peak values by applying either a single zener diode connected between the line terminals, or by replacing two diodes in the Graetz circuit by zener diodes.

However, in practice it has appeared that in spite of the use of said measures, the integrated circuits were not in all circumstances protected against the occurrence of undesired signal conditions caused by said disturbing signals.

It is an object of the invention to provide a protection device for subscribers telephone sets which provides in all circumstances a particularly sure protective action against disturbing signals introduced from the outside via the subscribers' lines and which can, furthermore, be realized in a very simple manner.

The protection device according to the invention is therefore characterized in that one of the input terminals is connected to one of the output terminals, and that the device comprises a resistor which is connected between the other input and the other output terminal. A network is provided with a control input connected between the output terminals, which network, which has a high impedance in the quiescent state, is adjustable to a low impedance by means of a control signal supplied to the control input. The network comprises a threshold device connected in parallel with the resistor. An output of which threshold device is coupled to the control input of a network for applying said control signal to the control input of the network when the given threshold voltage of the threshold device is exceeded by the voltage across the resistor.

Applicant has carefully studied the problem and has ascertained that the protection by means of a zener diode and a line matching circuit was insufficient to protect the integrated circuits from disturbing currents supplied via the subscriber's line, owing to the fact that, on the one hand a zener diode can only cope with a limited energy in spite of the fact that they are rated for high powers, and on the other hand the line matching circuit must have such a large time constant, that said alternating currents do not exercise any influence on the line matching.

The invention and its advantages will now be further explained with reference to an embodiment of a protection device which is shown in the FIGURE.

The protection device 1 shown in the FIGURE comprises two input terminals 2 and 3 and two output terminals 4 and 5. It is an object of the invention to protect the integrated circuits of a subscriber's telephone set 6 connected to the output terminals 4 and 5 from undesired signal conditions, in which a diode bridge 7 may have been applied between subscribers line terminals 9 and 10 and the input terminals 2 and 3 of the device 1 as a protection against incorrect polarity and a zener diode 8 as a protection against short pulses of a high power.

To protect the zener from disturbing signals having a large energy contents and consequently the integrated circuits of the subscribers telephone set 6 from disturbing signals on the subscribers lines which are of long duration and have a high current strength, the protection device comprises a resistor 11 connected between the terminals 2 and 4, a threshold device 12 connected in parallel with the resistor 11 and a network 14 provided with a control input 13, which network is connected between the output terminals 4 and 5. This network 14 comprises a transistor 15 having a resistor 16 in the emitter circuit. To control this transistor the threshold device 12 comprises a transistor 17 and a resistor 18, which resistor is connected in series with the emitter-base junction parallel to resistor 11 and the collector of which is connected to the base of transistor 15 via control input 13.

The operation of the part of the protection device described so far as is follows.

The resistor 11 is of such value that a voltage drop across the resistor 11 caused by a line current in the normal operating condition is not capable of rendering the transistor 17 conductive. Then no base current is supplied to the transistor 15 so that it does not conduct and the network 14 has a high impedance.

When the line current increases owing to disturbing signals the voltage across the resistor 11 will increase. When the threshold value determined by the base-emitter junction voltage of transistor 17 is exceeded by the voltage across the resistor the transistor 17 will start conducting, which makes the transistor 15 conductive too. The impedance of the network 14 is then determined by the small impedance of the resistor 16. This impedance has been chosen arbitrarily small by the choice of the value of resistor 16. The undesired currents fed forward by the subscribers lines are then discharged via transistor 16, so that the voltage between the output terminals 4 and 5 remains limited and the subscribers telephone set 16 is not overloaded.

The network 14 may also be arranged as subscribers' s line matching circuit. To this end the network is provided with a voltage divider (shown by dashed lines) connected between the output terminals 4 and 5, which voltage divider comprises the resistors 19 and 20 and whose tapping point 21 is connected to the control input 13 and which is provided with a capacitor 22 connected between the base of transistor 15 and output terminal 5.

The magnitude of the capacitor 22, the resistor 19 and the resistor 20 has been chosen such that the potential at the base of the transistor 15 is not affected by speech-, voice- frequency dial signals and dial tones.

The supply voltage at a given impedance of the subscribers telephone set, which is determined by the battery voltage of the exchange, the supply resistors in the exchange, and the resistance of the subscribers lines at the input terminals 2 and 3, is limited by the network to a value which is determined by the ratio of the resistors 19 and 20. When the protection device 1 is connected to a subscriber's line having a length smaller than the maximum permissible length, the voltage of the base of transistor 15, determined by the voltage divider 19, 20 is high enough that transistor 15 is rendered more conductive. The voltage drop caused by this current increase across the line resistances decreases the dc voltage occurring at the output terminals 4 and 5 to a value determined by the resistors 19, 20 and 16. To compensate for the influence of the length of the subscriber's line on the threshold value of the threshold device 12, the resistor 11 is variable.

By applying a zener diode 23 parallel to the resistor 19 of the voltage divider a further improvement of the protective action of the protection device is obtained.

When a disturbing signal is produced the zener diode 23 will quickly charge the capacitor 22, wherein the current in transistor 15 rapidly increases, and as a result of which, the threshold voltage of the threshold device will become operative earlier than in the case when zener diode 23 is not present.

Furthermore, applying the zener diode 23 results in that when the receiver is removed from the cradle in the telephone 6, the time for charging the capacitor 23 is reduced as the resistor 19 is shunted on actuation by the low differential resistance of the zener diode 23, so that the normal operating condition is reached quicker.

What is claimed is:

1. A protection device for a subscriber's telephone set in a telephone system, said device comprising two input and output terminals, one of the input terminals being coupled to one of the output terminals, a resistor coupled between the other input and the other output terminal, a network having a control input and a pair of current carrying terminals coupled between the output terminals, said network having a high impedance in the quiescent state and a low impedance when a control signal is supplied to the control input, a threshold device coupled in parallel with said resistor and having an output means coupled to said control input of the network for substantially instantaneously applying said control signal to the control input of the network when and for as long as the voltage across the resistor exceeds a given threshold voltage of the threshold device regardless of the extent to which said resistor voltage exceeds said given threshold voltage and the position of a handset in said telephone set, said given threshold being higher than the voltage across the resistor during normal operation of the subscriber telephone set.

2. A protection device as claimed in claim 1, wherein the network further comprises a transistor having a main current path coupled to the output terminals, the base of said transistor being coupled to the control input of the network.

3. A protection device as claimed in claim 2, wherein the network further comprises a voltage divider coupled between the output terminals, a tap of said voltage divider being coupled to the base control input of the transistor, and a capacitor connected between the control input of the transistor and the output terminal with which the emitter of the transistor is coupled.

4. A protection device as claimed in claim 3, wherein said network further comprises a zener diode coupled between the control input of the transistor and the output terminal with which the collector of the transistor is coupled.

5. A protection device as claimed in claim 1, wherein the threshold device comprises a transistor having an emitter coupled to said other input terminal, a base coupled to said other output terminal, and a collector coupled to the control input of the network.

* * * * *